United States Patent [19]

Braun et al.

[11] Patent Number: 4,588,072
[45] Date of Patent: May 13, 1986

[54] SCRAPER CHAIN CONVEYOR TROUGH WITH REINFORCING PLATE

[75] Inventors: Gert Braun; Ernst Braun, both of Essen-Heisingen, Fed. Rep. of Germany

[73] Assignee: Halbach & Braun, Fed. Rep. of Germany

[21] Appl. No.: 487,143

[22] Filed: Apr. 21, 1983

Related U.S. Application Data

[63] Continuation of Ser. No. 231,805, Feb. 5, 1981, abandoned.

[30] Foreign Application Priority Data

Feb. 9, 1980 [DE] Fed. Rep. of Germany ....... 3004892

[51] Int. Cl.[4] ............................................. B65G 19/28
[52] U.S. Cl. ................................... 198/735; 198/861.2
[58] Field of Search ........... 198/584, 735, 864, 861.2; 299/34, 18, 43–45, 64–67

[56] References Cited

U.S. PATENT DOCUMENTS

| 4,074,804 | 2/1978 | Grundken et al. | 198/735 |
| 4,205,882 | 6/1980 | Hauschopp et al. | 299/43 |

FOREIGN PATENT DOCUMENTS

| 827937 | 1/1952 | Fed. Rep. of Germany | 198/864 |
| 848177 | 7/1952 | Fed. Rep. of Germany | 198/735 |
| 2243085 | 3/1974 | Fed. Rep. of Germany | 198/735 |
| 745799 | 2/1956 | United Kingdom | 198/735 |
| 1108187 | 4/1968 | United Kingdom | 299/43 |

Primary Examiner—Joseph E. Valenza
Attorney, Agent, or Firm—McGlew and Tuttle

[57] ABSTRACT

A plate and scraper chain conveyor trough is disclosed for mining operations. Each conveyor trough which has opposite lateral sidewalls is provided with reinforcing plates which are welded to the sidewalls. Each reinforcing plate has a socket member at one end and a ball member at the other end. The ball member is adapted to engage a socket member of a plate in an adjacent trough to enable the conveyor length made up of a plurality of troughs to withstand increased pull from a scraper chain which is pulled with increased power.

7 Claims, 3 Drawing Figures

U.S. Patent   May 13, 1986   4,588,072
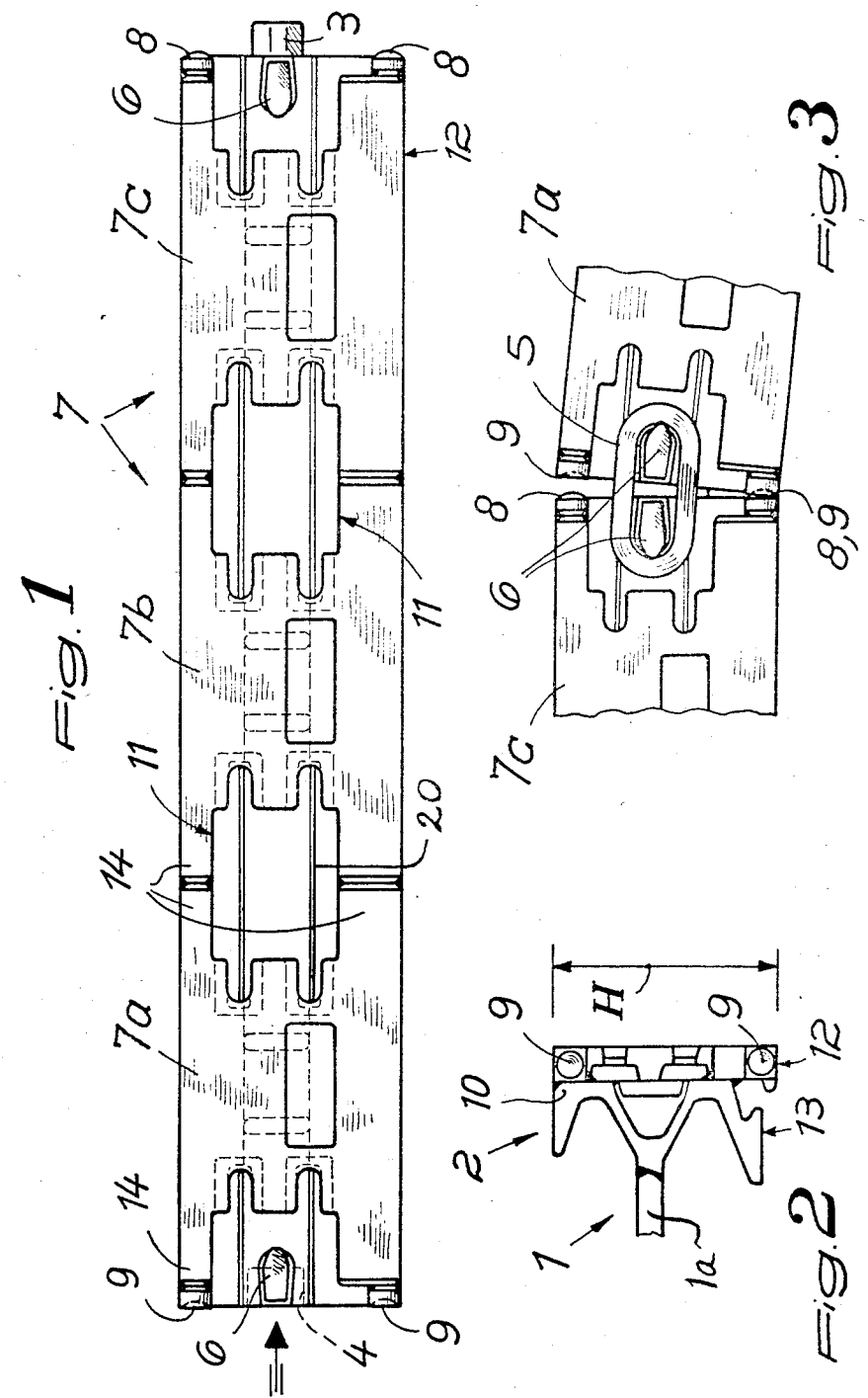

SCRAPER CHAIN CONVEYOR TROUGH WITH REINFORCING PLATE

FIELD AND BACKGROUND OF THE INVENTION

This is a continuation of application Ser. No. 231,805 filed Feb. 5, 1981, and now abandoned.

The present invention relates to mine equipment in general and, in particular, to scraper chain conveyors having their troughs assembled of trough sections with plate-covered sidewalls.

In prior art scraper chain conveyors, as currently employed in underground mining operations, only the trough walls at the coal face side are covered with plates as a rule. These plates are used, for example, for guiding a coal planer or plough. The guide plates are only secured to the trough sidewalls and hardly contribute to a reinforcement of these walls or the trough sections. The same holds true for planer guide segments connected at the coal side, or brackets connected at the waste side, where again, screw connections are provided. The coal side is the side of the conveyor next to a coal face to be mined and the waste side is away from the coal face.

Scraper chain conveyors of the above-mentioned kind are employed at a growing rate in relatively long mine workings. The correspondingly long conveyors require more power for driving the chain or chains that convey the coal taken from the coal face, depending on whether a single- or two-chain conveyor is concerned.

In fact, frequently, the drive power supply must be doubled or even further increased. This requires stronger chains, but also the conveyor trough formed of sections must be designed for stronger chain pulls. As a rule, the conventional sectional structures of trough sidewalls are not satisfactory in this regard, simply because with a conveyor trough necessarily laid over crests and depressions, the trough sections are supported only in their zones of abutment, thus, in areas where they butt against each other by the upper or lower edge of their end portions.

Under further unfavorable conditions, namely, if the sections are misaligned horizontally as well, to follow a horizontally curved face, the edge support is even unilateral. In such instances, conventional scrape chain conveyors are no longer suitable for absorbing the chain pull exerted under augmented power. Similar problems arise if the support is effected through guide plates, planer guide segments or the like. The invention provides remedial measures in this respect.

SUMMARY OF THE INVENTION

The present invention is directed to a scraper chain conveyor of the above-mentioned kind which comprises a conveyor trough which, while being assembled of conventional (substantially standard) trough sections, is capable of absorbing the chain pulls resulting from an increased power supply even if it is supported only unilaterally in the zones where the edges of the adjacent trough sections abut each other.

To this end, and in accordance with the invention, reinforcing plates are locked to both sidewalls of each trough section under pressure and to a large extent positively, and are provided on their abutting ends with spherical joint elements including a spherical head on one side and a spherical socket on the other side, which are engageable with each other under a centering effect and through which the sections can bear against each other.

The invention starts from the experience that to withstand the chain pulls resulting from a drive power increase, the conventional, substantially standard sections of a scraper chain conveyor trough must first be stabilized in a way which preserves the given cross-sectional shape of their sidewalls. This can be done by means of the reinforcing plates which are secured to the sidewalls of the trough sections by means which exert a locking pressure and, at least partly, also by positive engagement. The thickness of the reinforcing plates is determined by the required supporting strength while considering the chain pull forces to be transmitted.

In addition, the invention teaches that the trough sections which are connected to each other in a conventional manner, bear against each other through spherical joint elements which are provided in the abutment zone of the reinforcing plates. For this purpose, the abutting ends of the reinforcing plates are provided with spherical heads on one side and corresponding spherical sockets on the other side. Such spherical joint elements can easily transfer the forces caused by increased chain pulls, even if the trough sections would bear against each other only unilaterally by their abutting edges. The spherical joint elements are properly dimensioned in this regard. Moreover, the spherical joints facilitate the assembly of the sections in positions which are horizontally or vertically angled if the conveyor is laid over crests and depressions or in curves.

In practice, due to the inventive spherical joints, the reinforcing plates, bearing against each other, cannot slip relative to each other in their zone of abutment. While the elements connecting the trough sections are thereby relieved, the edges of the sidewalls of the trough sections which do not abut against each other are no longer subjected to deformations. In fact, with the interposition of the spherical joints, the reinforcing plates are capable of taking up compressive forces of up to several hundred metric tons. Through the reinforcing plates and their spherical joints, the trough sections proper are thus relieved of stresses to a very large extent.

There are further features which are important to the invention. On both abutting ends, the reinforcing plates are shorter than the sidewalls of the trough sections, and the spherical heads and sockets are welded to the end faces of the reinforcing plates and, at least in the upper portion of the reinforcing plates, also to the projecting portions of the trough sidewalls. Therefore, in practice, the reinforcing plates with the spherical joint elements, and the sidewalls of the trough sections form a constructional unit.

In accordance with the invention, the reinforcing plates are designed with recesses corresponding to connecting means which would be provided for additional structures associated with the sidewalls of the trough sections This makes it possible to equip the conventional trough sections with unchanged connecting means, which are substantially standard, for guide plates, planer guiding segments, brackets, cutter mounting parts, etc. Such equipment is thus mounted on the reinforcing plates, but secured in a conventional manner to the sidewalls of the trough sections.

Preferably, the lower edges of the reinforcing plates project to a predetermined extent below the level of the lower edges of the sidewalls so that they scrape the floor during advance of the conveyor, and coal fragments cannot penetrate to the lower run of the conveyor and a sufficient clearance is always ensured for the scrapers secured to the chain. Also, the conveyor trough is thus prevented from climbing during the advance. With such a design of a downwardly projecting lower edge of the reinforcing plate, the lower spherical joint elements are welded only to the reinforcing plates not to the sidewall of the trough.

In particularly important preferred embodiment of the invention, each reinforcing plate for a single trough section sidewall is subdivided into three identical segments, so that six such segments are needed for a trough section. The manufacture of the plates is thereby considerably simplified since the segments can be drop-forged, so that not only plates of increased strength are produced, but also their strength is inexpensively obtained. This is particularly true if the segments are designed in accordance with the invention, namely, as substantially H-shape flange plates which are then welded together and to the trough sidewalls while forming recessed areas between the H-legs. While considering the standardized lengths of the trough sections, the size of the identical segments may be such that the ends of the trough sections project beyond the end faces of the reinforcing plates by an amount just sufficient for welding the spherical heads or sockets thereto.

In this connection, the invention teaches that the spherical heads and sockets are welded to the upper and lower end faces formed by the free ends of the H-legs of the reinforcing plate, and that they are flush with the upper and lower edges of the reinforcing plate. The spherical joints are thus located in the uppermost and lowermost areas of the end faces of the reinforcing plates. This relatively large distance between the two spherical joints on each of the abutting ends results in an increased restoring moment if the trough sections are at an angle about the upper or lower spherical joints. This restoring moment which is increased because of the longer lever arm, is important just if the load is higher.

The height of the reinforcing plates may correspond to that of the sidewalls of the trough. They may be made higher, however, if an increased filling volume of the trough is desired, for example. Also, at the coal side, the reinforcing plates may be designed as planer guide segments.

The invention is substantially advantageous in that a scraper chain conveyor assembled of a train of interconnected trough sections is provided in which the sidewalls of the trough sections are reinforced both on the coal side and the waste side by means of reinforcing plates in such a way that the sections which bear against each other through the reinforcing plates are capable of taking up extremely high chain pull forces and, consequently, make it possible to use a much higher chain drive power than before.

The conventional cross-sectional structures of the trough sections are maintained. The inventive scraper chain conveyor is therefore suitable for being employed in extremely long workings while, at the same time, remaining usable as a guide for winning machines, such as a coal planer, a cutter, etc. The reinforcing plates are designed and subdivided so that they can be manufactured economically even by drop-forging. Their support in the zones of abutment through spherical joints makes it possible to place adjacent trough sections into positions at an angle with a centering effect, and to ensure a transfer of the compression forces resulting from the chain pull without causing deformations even under unfavorable conditions when a single spherical joint between the adjacent sections takes up the load.

To summarize, the inventive scraper chain conveyor is a steadfast construction suitable for operation in long workings.

Accordingly, an object of the present invention is to provide a plate and scraper chain conveyor trough combination, comprising, a trough having sidewalls on opposite lateral sides thereof and opposite trough ends, and a reinforcing plate fixedly secured to each trough sidewall extending from one trough end to an opposite trough end, with a spherical socket member having a partial spherical socket connected to the plate at one trough end and a spherical ball member having a partial spherical ball connected to the plate at the opposite trough end whereby a plurality of said troughs with plates are assembled to form a conveyor length with one partial ball of one plate engaged in a partial socket of an adjacent plate in the conveyor length.

Another object of the invention is to provide the plate in an H-shape having socket or ball members at the end of each leg of the H-shape.

A further object of the invention is to provide each conveyor trough with a plurality of H-shape plate members assembled at the legs of the H-shape trough members.

A still further object of the invention is to provide a scraper chain conveyor trough with plates which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

In the Drawing:

FIG. 1 is a side elevational view of a trough section of the scraper chain conveyor constructed in accordance with the invention;

FIG. 2 is a front partial view in the direction of the arrow of FIG. 1; and

FIG. 3 is a partial side elevational view of the zone of abutment of two trough sections set at an angle to each other.

DESCRIPTION OF THE PREFERRED EMBODIMENT

Turning to the drawing in particular, the invention embodied therein, comprises, a scraper chain conveyor trough and reinforcing plate combination which utilizes the reinforcing plates to establish engagement surfaces between adjacent troughs which are assembled to form a conveyor length.

The drawings show a scraper chain conveyor trough assembled of trough sections 1 of predetermined lengths, whose sidewalls 2 are covered with plates. Trough 1 receives a scraper chain (not shown) above and below its web 1*a*. The trough sections are connected to each other in a conventional manner by means of connecting bolts 3, pockets for receiving bolts 3, and connecting links 5, with bolts 3 and pockets 4 being provided with laterally projecting connecting noses 6 and associated with lateral recesses for links 5.

Reinforcing plates 7 are pressure-locked to both sidewalls 2 of trough section 1 (only one being shown in FIG. 2). On their end faces adjacent the next sections (not shown), plates 7 are provided with spherical heads 8 and spherical sockets 9. By means of these spherical elements 8 and 9, and under the mutually centering effect thereof, trough sections 1 can be brought into abutting relationship with each other.

In principal, only spherical sockets 9 can be provided on one end of plates 7 and only spherical heads 8 on the other end, as shown. However, alternately, sockets 9 and heads 8 may also be provided. On both their ends, plates 7 are shorter than sidewalls 2 of the trough section. Spherical heads 8 and spherical sockets 9 are welded to the end faces of plates 7 and, in addition, at least in the upper portion of plates 7 to the projecting portions 10 of sidewalls 2 of the troughs.

In order to be able to use conventional trough sections equipped with means for connecting, for example, planer guiding segments, guide plates or brackets at 20, reinforcing plates 7 are provided in the zone of such connecting means with corresponding recsses 11.

The lower edges 12 of plates 7 project to a predetermined extent below the level of the lower edge 13 of trough sidewalls 2. Over the extent of a sidewall 2 of a single trough section, every plate 7 is subdivided into three identical plate segments 7a, 7b and 7c. Plate segments 7a, 7b, 7c are designed as substantially H-shape flange plates which are welded to each other and to sidewalls 2, while recessed areas 11 are formed by the abutting H-legs. To the upper and lower end faces of reinforcing plates 7 formed by the free ends 14 of the H-legs, the spherical heads 8 and sockets 9 are welded flush with the respective upper and lower edge of plates 7. The height H of reinforcing plates 7 corresponds to the height of sidewalls 2 of the trough. However, plates 7 may be made higher than walls 2 to increase the cross-sectional area under a web 1a of troughs 1. At the coal side, plates 7 may also be designed as planer guiding segments (not shown).

While a specific embodiment of the invention has been shown and described in detail of illustrate the application of the principles of the invention, it will be understood that the invention may be embodied otherwise without departing from such principles.

What is claimed is:

1. A trough and plate combination for a scraper chain conveyor, comprising:
    a trough having side walls on opposite lateral sides thereof, opposite trough ends and side wall bottom edges;
    a flat reinforcing plate fixedly secured to each of said side walls extending partly from one trough end to another and having upper and lower edges as well as opposite butt ends, a lower edge of each plate extending below a bottom edge of each respective side wall;
    an upper and a lower spherical socket member having a partial spherical socket connected to each plate adjacent a respective upper and lower edge thereof and at one of said butt ends;
    an upper and a lower spherical ball member having a partial spherical ball connected to each plate adjacent a respective upper and lower edge thereof and at an opposite one of said butt ends, so that a plurality of said troughs are assembled with at least one partial spherical ball of a plate of one trough engaged in a partial spherical socket of a plate of an adjacent trough in the assembly; and
    means for holding adjacent troughs against each other positioned between each upper ball and socket member and each lower ball and socket member so that each partial spherical ball and engaged socket forms centering elements between adjacent troughs;
    each socket member being flush with respective upper and lower plate edges, with one of said opposite trough ends, and with an outer surface of at least one of said plates.

2. A combination according to claim 1, wherein said trough comprises a trough for a scraper chain conveyor in a coal mine having a coal face, said at least one of said reinforcing plates being adjacent said coal face and being designed as a planer guide segment.

3. A combination according to claim 1, wherein at least one sidewall of said trough includes connection means for connecting additional equipment to said one sidewall, said at least one of said reinforcing plates connected to said one sidewall having openings for permitting access to said connection means.

4. A combination according to claim 3, wherein said at least one of said reinforcing plates comprises at least one H-shape plate having two legs extending toward each of said trough ends, each leg having at least one of said spherical socket and spherical ball members connected thereto, said opening defined between said legs.

5. A combination according to claim 1, wherein said reinforcing plate is made up of a plurality of plate segments welded to each other end to end along each of said sidewalls.

6. A combination according to claim 1, wherein a vertical height of each of said reinforcing plates is at least equal to a vertical height of each of said sidewalls.

7. A combination according to claim 4, wherein said at least one of said reinforcing plates comprises three substantially identical plate sections, each having an H-shape with a pair of legs at each end, pairs of legs of adjacent plate sections being fixed together to form a plurality of said openings therebetween.

* * * * *